(12) United States Patent
Jurasek et al.

(10) Patent No.: US 7,633,331 B2
(45) Date of Patent: Dec. 15, 2009

(54) DYNAMIC VOLTAGE PUMP CIRCUIT AND METHOD OF DYNAMICALLY GENERATING AN OUTPUT SUPPLY VOLTAGE THEREOF

(75) Inventors: Ryan Andrew Jurasek, S. Burlington, VT (US); Bret Roberts Dale, Jericho, VT (US); Darin James Daudelin, Williston, VT (US); Dave Eugene Chapmen, Shelburne, VT (US)

(73) Assignee: Nanya Technology Corp., Kueishan, Tao-Yuan Hsien (TW)

( * ) Notice: Subject to any disclaimer, the term of this patent is extended or adjusted under 35 U.S.C. 154(b) by 0 days.

(21) Appl. No.: 12/050,178

(22) Filed: Mar. 18, 2008

(65) Prior Publication Data

US 2009/0237146 A1    Sep. 24, 2009

(51) Int. Cl.
  *G05F 1/10*   (2006.01)
(52) U.S. Cl. ........................... 327/536; 363/59
(58) Field of Classification Search ........... 327/530, 327/534–536, 589; 363/59–60
   See application file for complete search history.

(56) References Cited

U.S. PATENT DOCUMENTS 6,411,157 B1 *   6/2002   Hsu et al. .................... 327/536
2008/0136500 A1 *  6/2008   Frulio et al. ................ 327/536

* cited by examiner

*Primary Examiner*—Lincoln Donovan
*Assistant Examiner*—Shikha Goyal
(74) *Attorney, Agent, or Firm*—Winston Hsu

(57) ABSTRACT

A dynamic voltage pump circuit includes a first stage voltage pump, a second stage voltage pump, a limiter, and a comparator. The first stage voltage pump generates an intermediate supply voltage according to an input supply voltage and a pump signal. The second stage voltage pump generates an output supply voltage according to the intermediate supply voltage, the pump signal, and an enable signal; the second stage voltage pump is enabled and disabled when the enable signal is asserted and de-asserted, respectively. The limiter controls the pump signal according to a comparison of the output supply voltage with a first reference voltage. The comparator compares the first reference voltage with a second reference voltage to generate the enable signal, and can assert the enable signal when the desired output supply voltage exceeds the maximum possible intermediate supply voltage generated by the first stage voltage pump.

20 Claims, 3 Drawing Sheets

DYNAMIC VOLTAGE PUMP CIRCUIT AND METHOD OF DYNAMICALLY GENERATING AN OUTPUT SUPPLY VOLTAGE THEREOF

BACKGROUND OF THE INVENTION

1. Field of the Invention

The present invention relates to a dynamic voltage pump circuit, and more particularly, a dynamic voltage pump circuit for increased efficiency at low output voltages and a method thereof.

2. Description of the Prior Art

As today's applications for electronic systems grow at ever-increasing rates, the demand for more efficient energy performance is never ceasing. One such circuit providing power to electronic systems is the voltage pump.

Voltage pumps are circuits that generate a voltage larger than the supply voltage from which they operate. Voltage pumps are key circuits in such applications as Electrically Erasable Programmable Read-Only Memory (EEPROM) and flash memory devices. These devices normally operate at low voltages, but require high voltage pulses to erase existing data from memory cells before they can be written with new data. The higher voltage needed to erase the memory cells is generated internally with an on-chip voltage pump.

While voltage pump circuits are capable of efficiencies sometimes as high as 90-95%, this means that there is at least a 5% wasted energy overhead for operating a voltage pump. Furthermore, a single-stage voltage pump is limited to providing an external supply voltage of at most twice its input supply voltage; to achieve external supply voltage in multiples higher than two, consecutive stages of voltage pumps are necessary. For instance, to provide an external supply voltage capable of four times the input supply voltage (as shown in the related art depicted in FIG. 1), a two-stage voltage pump circuit is implemented: a first stage 110 doubles the input supply voltage, whereas a second stage 120 doubles the already-doubled intermediate supply voltage. The limiter 130 provides a signal to control both the first and second stages 110, 120. Because each stage of a voltage pump has (1190, 120) an inefficiency overhead, having more stages in a voltage pump 100 reduces the overall efficiency of the voltage pump 100.

SUMMARY OF THE INVENTION

It is therefore an objective of the present invention to solve the aforementioned problems, and to provide a dynamic voltage pump circuit for increased efficiency at low output voltages and a method thereof.

A dynamic voltage pump circuit according to an embodiment of the present invention comprises a first stage voltage pump, a second stage voltage pump, a limiter, and a comparator. The first stage voltage pump is for generating an intermediate supply voltage according to an input supply voltage and a pump signal. The second stage voltage pump is for generating an output supply voltage according to the intermediate supply voltage, the pump signal, and an enable signal. The limiter is for controlling the pump signal according to a comparison of the output supply voltage with a first reference voltage. The comparator is for comparing the first reference voltage with a second reference voltage to thereby generate the enable signal. In this embodiment, the second stage voltage pump is enabled when the enable signal is asserted and disabled when the enable signal is not asserted.

A method for dynamically generating an output supply voltage is also disclosed in the present invention, the method comprising: generating an intermediate supply voltage, generating an output supply voltage, controlling a pump signal, and comparing a first reference voltage with a second reference voltage. The step of generating an intermediate supply voltage utilizes a first stage voltage pump, according to an input supply voltage and a pump signal. The step of generating an output supply voltage utilizes a second stage voltage pump, according to the intermediate supply voltage, the pump signal, and an enable signal. The step of controlling the pump signal utilizes a limiter, according to a comparison of the output supply voltage with a first reference voltage. The step of comparing the first reference voltage with a second reference voltage utilizes a comparator to thereby generate the enable signal. In this embodiment of this method of the present invention, the second stage voltage pump is enabled when the enable signal is asserted and disabled when the enable signal is not asserted.

These and other problems are generally solved or circumvented, and technical advantages are generally achieved, by advantageous embodiments of the present invention, which includes a dynamic voltage pump circuit that can bypass a second stage voltage pump according to a number of conditions, and a related method.

The foregoing has outlined rather broadly the features and technical advantages of the present invention in order that the detailed description of the invention that follows may be better understood. Additional features and descriptions of the present invention will be described hereinafter which form the subject of the claims of the present invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

In the related art, in an application where the power requirements could reach four times the input supply voltage—even if normal operation is mainly less than double the input supply voltage—a voltage pump circuit with at least two stages is implemented. If the required external supply voltage is normally a level that could be provided by a single stage voltage pump circuit, having an implemented two stage voltage pump circuit introduces efficiency degradation due to the second (normally unnecessary) stage in the voltage pump circuit. For such scenarios, the related art implements a two stage voltage pump, and this inefficiency disadvantage in the related art leaves much room for improvement in the efficiencies of voltage supplies.

Figure 1:
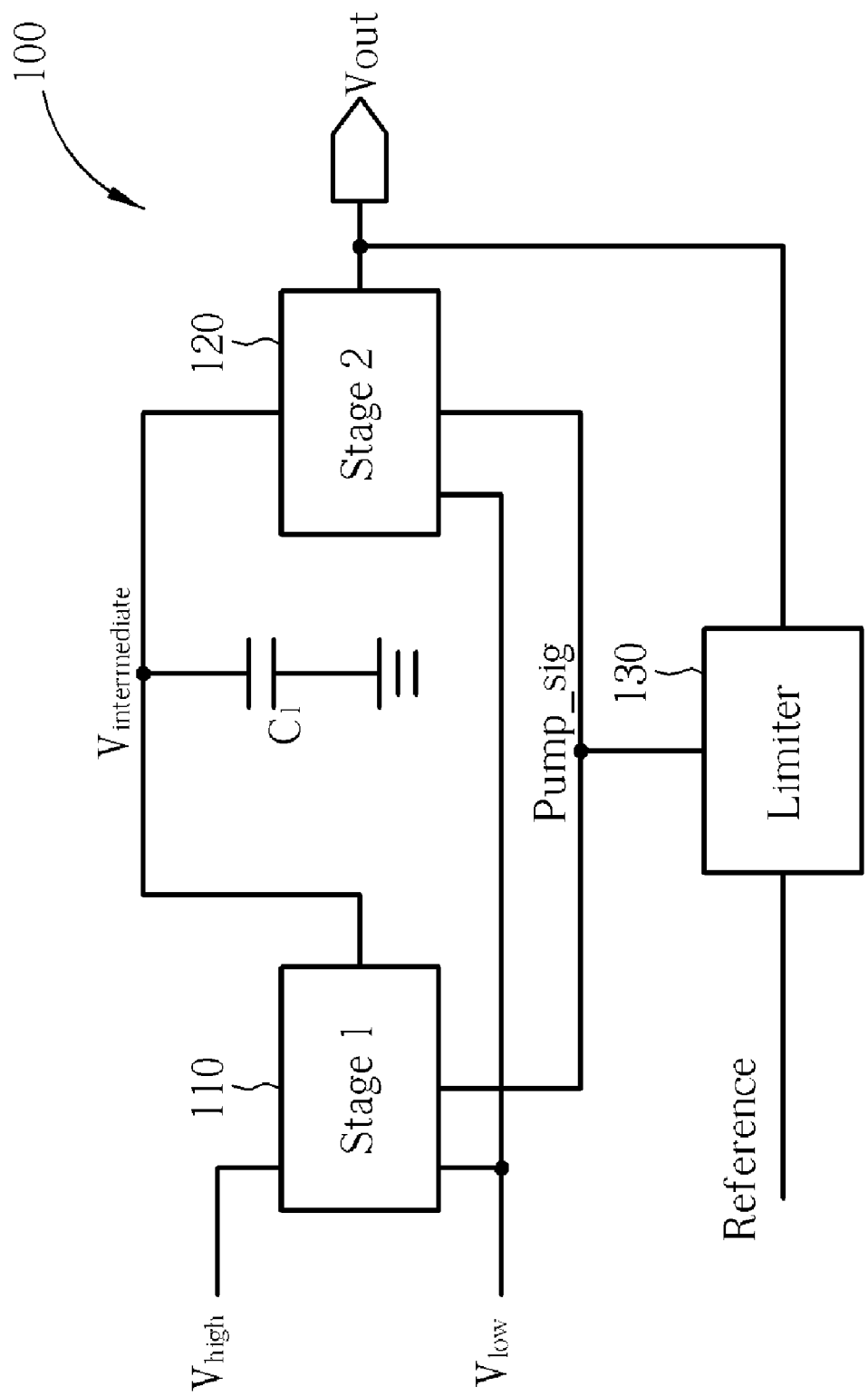
FIG. 1 is a diagram illustrating a two-stage voltage pump circuit according to the related art.
Figure 2:
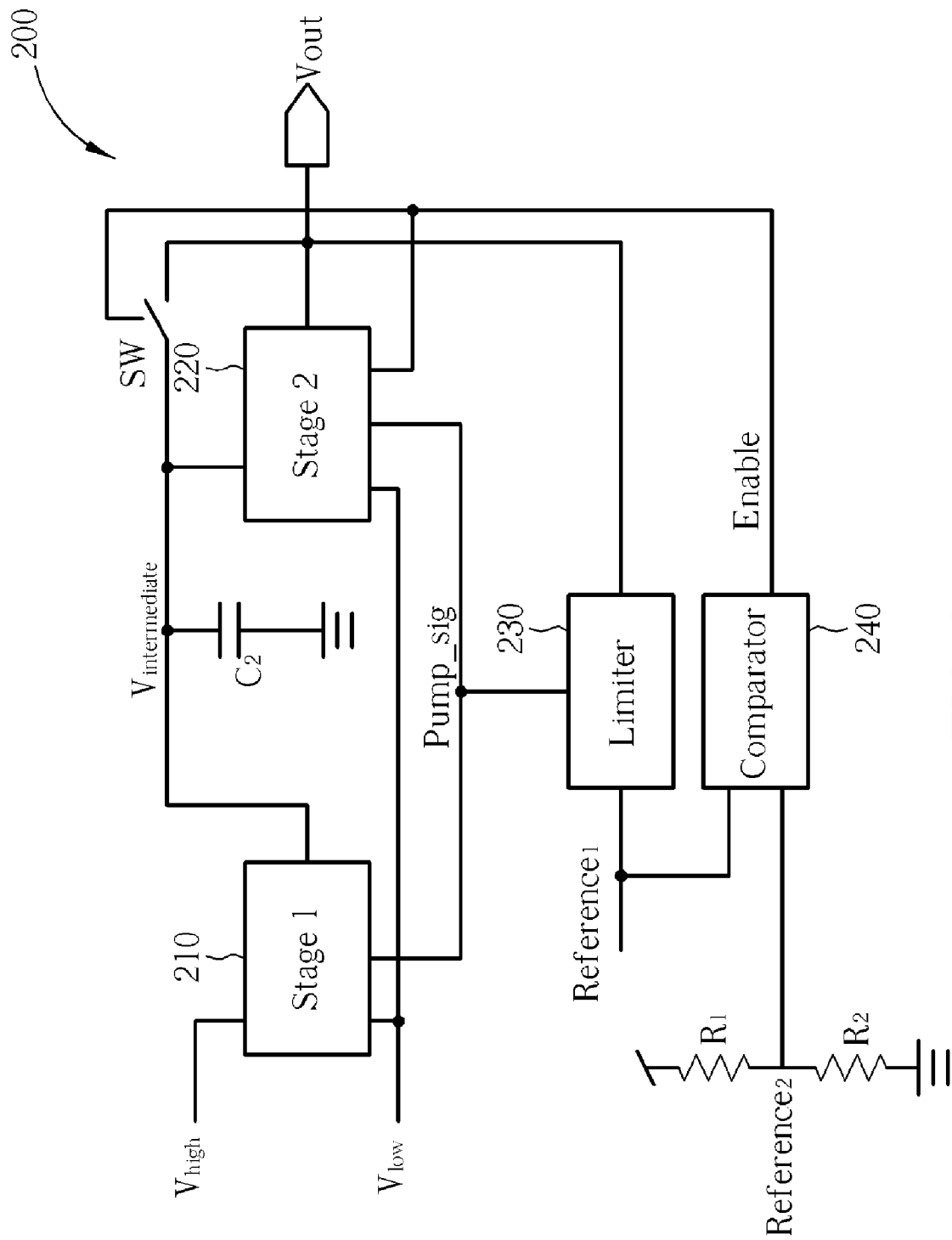
FIG. 2 is a diagram illustrating a dynamic stage voltage pump circuit according to an embodiment of the present invention.

A dynamic stage voltage pump is presented in FIG. 2 according to an exemplary embodiment of the present invention. The dynamic stage voltage pump 200 of FIG. 2 comprises a first stage voltage pump 210, a second stage voltage pump 220, a limiter 230, and a comparator 240. The first stage voltage pump 210 has inputs coupled to an input supply voltage (shown in FIG. 2 as Vhigh and Vlow) and to a pump signal Pump_sig, and generates an intermediate supply voltage Vintermediate according to the input supply voltage (across Vhigh and Vlow) and the pump signal Pump_sig. The second stage voltage pump 220 has an input coupled to the output of the first stage voltage pump 210 (Vintermediate), another input coupled to Vlow, and a third input coupled to the same pump signal Pump_sig to which the first stage voltage pump 210 is coupled. The second stage voltage pump 220 generates an output supply voltage Vout according to the intermediate supply voltage (across Vintermediate and Vlow), the pump signal Pump_sig, and an enable signal Enable. The limiter 230 has two inputs: one is coupled to a first reference voltage Reference1, the other coupled to the output supply voltage Vout. The limiter 230 controls the pump signal Pump_sig according to a comparison between the output supply voltage Vout and the first reference voltage Reference1, and the Pump_sig is fed to the first stage voltage pump 210 and the second stage voltage pump 220. The comparator 240 receives as input the first reference voltage Reference1 and a second reference voltage Reference2, and has an output signal Enable coupled to the second stage voltage pump 220.

The comparator 240 compares the first reference voltage Reference1 against the second reference voltage Reference2, and generates the enable signal Enable signal to the second stage voltage pump 220 according to the result of that comparison: when the enable signal Enable is asserted, the second stage voltage pump 220 is enabled to operate; when the enable signal Enable is deasserted, the second stage voltage pump 220 is disabled.

A controllable switch SW has one end coupled to the intermediate supply voltage Vintermediate (which is at one input of the second stage voltage pump 220), has another end coupled to the output supply voltage Vout, and is controlled according to the enable signal Enable (which is outputted by the comparator 240). The controllable switch SW is for selectively coupling the intermediate supply voltage Vintermediate to the output supply voltage Vout to thereby bypass the second stage voltage pump 220 when the enable signal Enable is deasserted. Please note that this controllable switch SW is not a requirement nor a limitation of the present invention; other techniques reaching the same objective or obtaining substantially the same results can also be implemented and should be clear to a person skilled in the pertinent art.

Likewise, some elements in FIG. 2 can be considered optional or could be substituted with other means to reach the same effect in this example (shown in FIG. 2) of the present invention. For example, in FIG. 2, the second reference voltage Reference2 is illustrated as being the result of a voltage divider, which consists of two resistors R1 and R2. It should be clear that a voltage divider is not the only means to providing the second reference voltage Reference2, and this is not meant as a limitation to the scope of the present invention. For instance, the second reference voltage Reference2 can be coupled to another circuit or other supply voltage (not shown).

A charge storage device C2 in FIG. 2 is shown to be coupled at one end to the intermediate supply voltage Vintermediate and at another end to ground. This charge storage device C2 (which can be a capacitor or other element to store charge) is for storing and maintaining the intermediate supply voltage Vintermediate to be provided as input to the second stage voltage pump 220, as the output of the first stage voltage pump 210 will tend to fluctuate. The second end of the charge storage device C2 in FIG. 2 is coupled to ground, but one notes the second end could also be coupled instead to the input voltage at Vlow, or to some other voltage level which can itself be maintained. Such options should be clear to a reader of average skill in the art.

In one embodiment of the present invention, the limiter 230 compares the output supply voltage Vout against the first reference voltage Reference1, and increases the pump signal Pump_sig when the output supply voltage Vout is lower than the first reference voltage Reference1. Likewise, the limiter 230 decreases the pump signal Pump_sig when the output supply voltage Vout is higher than the first reference voltage Reference1. Reference1 can be, for instance, set to be the desired output supply voltage Vout, but variations and deviations from this implementation are possible and should also be considered to be within the scope of the present invention.

Similarly, in the embodiment of the present invention depicted in FIG. 2, the comparator 240 compares the first reference voltage Reference1 against the second reference voltage Reference2, and asserts the enable signal Enable when the second reference voltage Reference2 is higher than the first reference voltage Reference1, and deasserts the enable signal Enable when the second reference voltage Reference2 is lower than the first reference voltage Reference1.

In such and other exemplary embodiments, the comparator 240 asserts the enable signal Enable when the output supply voltage Vout is desired to exceed a predetermined voltage. In one particular embodiment, the predetermined voltage is the maximum possible intermediate supply voltage Vintermediate that could be generated by the first stage voltage pump 210.

Because the comparator 240 utilizes the second reference voltage Reference2 for its basis of assertion, the second reference voltage Reference2 can be selected based on the related requirement (in this case, the maximum possible intermediate supply voltage Vintermediate mentioned above). For example, when the first stage voltage pump 210 can at most double the input supply voltage Vhigh over Vlow, then Reference2 can be determined as 2×Vhigh. Of course, the second reference voltage Reference2 utilized in the above embodiments can be predetermined based on a number of different design preferences and requirements. Again, this is but one of myriad different implementations which should be clear to the reader of average skill in the art.

In effect, the comparator 240 allows the dynamic stage voltage pump 200 to operate both the first stage voltage pump 210 and the second stage voltage pump 220 to provide a higher output supply voltage Vout when necessary, while operating only the first stage voltage pump 210 when a lower output supply voltage Vout is required—that is, when the second stage voltage pump 220 is not needed. Thus, the present invention eliminates the power consumption overhead (and operating inefficiencies) of the second stage voltage pump 220 when producing a low output supply voltage Vout. Essentially, the present invention allows a dynamic stage voltage pump to operate as either a single- or multiple-stage voltage pump as necessary.

Please note that although two stages are presented in the dynamic stage voltage pump example of FIG. 2 and this disclosure, it is an arbitrary selection for illustration purposes only and is not intended as a limitation to the present invention. The same design concept applies to a dynamic stage voltage pump comprising more than two stages, and after reading the embodiments of the present invention, a person skilled in the art can easily apply the present invention to three- or five- or multiple-stage voltage pumps. Such an extension of the features presented in this disclosure should still be considered inside the scope of the present invention.

Figure 3:
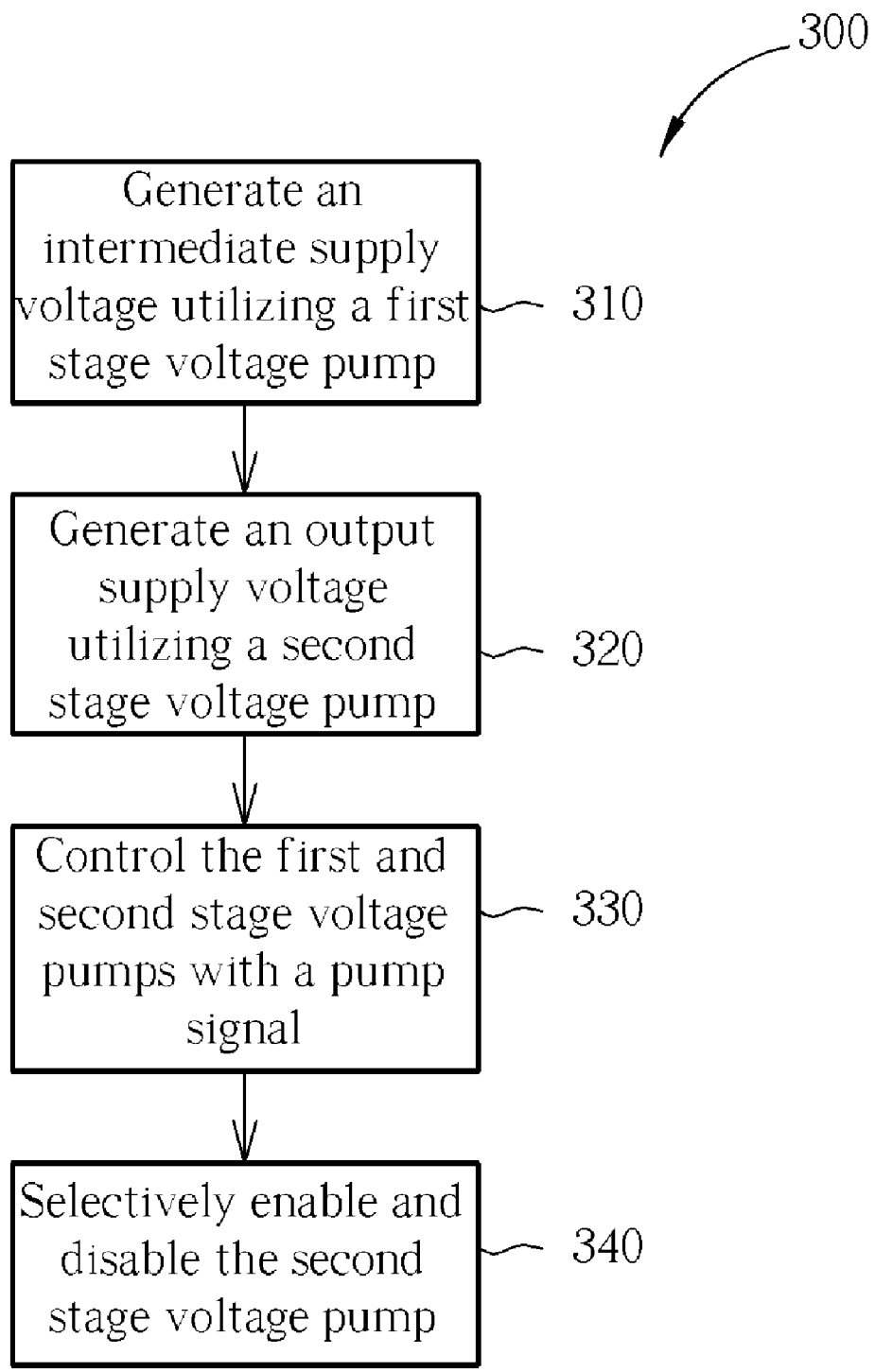
FIG. 3 is a flowchart illustrating a method of dynamically generating an output supply voltage according to an embodiment of the present invention.

Please refer to FIG. 3, which shows a flowchart 300 for dynamically generating an output supply voltage Vout, according to an embodiment of the present invention. Provided that substantially the same result is achieved, the steps of the process flowchart need not be in the exact order shown and need not be contiguous; that is, other steps can be intermediate or removed. The embodiment of the method according to the present invention includes the following steps:

Step 310: generate an intermediate supply voltage utilizing a first stage voltage pump Step 320: generate an output supply voltage utilizing a second stage voltage pump Step 330: control the first and second stage voltage pumps with a pump signal utilizing a limiter Step 340: selectively enable and disable the second stage voltage pump with an enable signal utilizing a comparator In a method embodiment according to the present invention, as depicted in FIG. 3, the method for dynamically generating an output supply voltage includes four main steps. Please refer concurrently to FIG. 2 and FIG. 3.

The method of FIG. 3 begins in Step 310 as generating an intermediate supply voltage Vintermediate by utilizing a first stage voltage pump 210, and the first stage voltage pump 210 operates according to the input supply voltage Vhigh/Vlow and a pump signal Pump_sig. The second stage voltage pump 220 then generates an output supply voltage Vout (Step 320) according to the intermediate supply voltage Vintermediate (the output of the first stage voltage pump 210), the pump signal Pump_sig, and an enable signal Enable.

Then, the limiter 230 controls the pump signal Pump_sig according to a comparison of the output supply voltage Vout with a first reference voltage Reference1 in Step 330. The pump signal Pump_sig is fed back into the first stage voltage pump 210 and the second stage voltage pump 220 to control their respective operations. As an example of one implementation in this step, the limiter 230 increases the pump signal Pump_sig when the output supply voltage Vout is lower than the first reference voltage Reference1, and decreasing the pump signal Pump_sig when the output supply voltage Vout is higher than the first reference voltage Reference1. In brief, the limiter 230 maintains the output supply voltage Vout to the desired level, by monitoring its level against that of the first reference voltage Reference1.

Similarly, Step 340 compares the first reference voltage Reference1 against a second reference voltage Reference2 by utilizing a comparator 240 to thereby generate the enable signal Enable: the second stage voltage pump 220 is enabled when the enable signal Enable is asserted, and is disabled when the enable signal Enable is deasserted. In one embodiment, the second stage voltage pump 220 is enabled only when the second reference voltage Reference2 is higher than the first reference voltage Reference1. As was described earlier, the value of the second reference voltage Reference2 can be determined according to a maximum possible intermediate supply voltage Vintermediate that could be generated from the first stage voltage pump 210; this could be implemented as a voltage divider. Other techniques and rationale for determining the value of the second reference voltage Reference2 are possible, and the examples provided herein are not intended to limit the scope of the present invention.

By the same token as described for the dynamic stage voltage pump 200 of FIG. 2, this method of the present invention essentially operates both the first stage voltage pump 210 and the second stage voltage pump 220 to provide a higher output supply voltage Vout when necessary, and operates only the first stage voltage pump 210 when a lower output supply voltage Vout is required, by comparing and monitoring the various values of the intermediate supply voltage Vintermediate, the output supply voltage Vout, and the first and second reference voltages Reference1 and Reference2. Thus, the second stage voltage pump 220 is only enabled when needed, eliminating the power consumption overhead (and operating inefficiencies) of the second stage voltage pump 220 when producing a low output supply voltage Vout. As such, the present invention allows a dynamic stage voltage pump 200 to operate as either a single- or multiple-stage voltage pump as necessary.

It should be noted that the present invention can be applied to any circuit that requires a power (voltage) source with higher efficiency, and such applications and embodiments also obey the spirit of and should be considered with the scope of the present invention. After reviewing the presented embodiments and examples of the present invention, other applications and implementations will be obvious to those skilled in the art, and should be included within the scope of the present invention.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Those skilled in the art will readily observe that numerous modifications and alterations of the device and method may be made while retaining the teachings of the invention.

What is claimed is:

1. A dynamic voltage pump circuit comprising:
   a first stage voltage pump for generating an intermediate supply voltage according to an input supply voltage and a pump signal;
   a second stage voltage pump for generating an output supply voltage according to the intermediate supply voltage, the pump signal, and an enable signal;
   a limiter for controlling the pump signal according to a comparison of the output supply voltage with a first reference voltage; and
   a comparator for comparing the first reference voltage with a second reference voltage to thereby generate the enable signal;
   wherein the second stage voltage pump is enabled when the enable signal is asserted and disabled when the enable signal is not asserted.

2. The dynamic voltage pump circuit of claim 1, further comprising a switch for selectively coupling the intermediate supply voltage to the output supply voltage to thereby bypass the second stage voltage pump when the enable signal is not asserted.

3. The dynamic voltage pump circuit of claim 1, wherein the limiter circuit is for increasing the pump signal when the output supply voltage is lower than the first reference voltage, and for decreasing the pump signal when the output supply voltage is higher than the first reference voltage.

4. The dynamic voltage pump circuit of claim 1, wherein the comparator is for asserting the enable signal when the second reference voltage is higher than the first reference voltage, and for deasserting the enable signal when the second reference voltage is lower than the first reference voltage.

5. The dynamic voltage pump circuit of claim 4, wherein the second reference voltage is determined according to a maximum possible intermediate supply voltage that could be generated from the first stage voltage pump.

6. The dynamic voltage pump circuit of claim 5, wherein the second reference voltage comprises a voltage divider circuit having at least one resistor.

7. The dynamic voltage pump circuit of claim 4, further comprising a switch for selectively coupling the intermediate supply voltage to the output supply voltage to thereby bypass the second stage voltage pump when the enable signal is not asserted.

8. The dynamic voltage pump circuit of claim 1, further comprising a charge storage device having one end coupled to the intermediate supply voltage and another end coupled to ground, for storing and maintaining a level of the intermediate supply voltage.

9. The dynamic voltage pump circuit of claim 1, wherein the comparator is for asserting the enable signal when a desired output supply voltage exceeds a predetermined voltage.

10. The dynamic voltage pump circuit of claim 9, wherein the comparator is for asserting the enable signal when a desired output supply voltage exceeds a maximum possible intermediate supply voltage that could be generated by the first stage voltage pump.

11. A method for dynamically generating an output supply voltage, the method comprising:
    generating an intermediate supply voltage utilizing a first stage voltage pump, according to an input supply voltage and a pump signal;
    generating an output supply voltage utilizing a second stage voltage pump, according to the intermediate supply voltage, the pump signal, and an enable signal;
    controlling the pump signal utilizing a limiter, according to a comparison of the output supply voltage with a first reference voltage;
    comparing the first reference voltage with a second reference voltage utilizing a comparator to thereby generate the enable signal; and
    enabling the second stage voltage pump when the enable signal is asserted and disabling the second stage voltage pump when the enable signal is not asserted.

12. The method of claim 11, further comprising selectively coupling the intermediate supply voltage to the output supply voltage utilizing a switch to thereby bypass the second stage voltage pump when the enable signal is not asserted.

13. The method of claim 11, further comprising increasing the pump signal utilizing the limiter circuit when the output supply voltage is lower than the first reference voltage, and decreasing the pump signal utilizing the limiter circuit when the output supply voltage is higher than the first reference voltage.

14. The method of claim 11, further comprising asserting the enable signal utilizing the comparator when the second reference voltage is higher than the first reference voltage, and deasserting the enable signal utilizing the comparator when the second reference voltage is lower than the first reference voltage.

15. The method of claim 14, further comprising determining the second reference voltage according to a maximum possible intermediate supply voltage that could be generated from the first stage voltage pump.

16. The method of claim 15, wherein the second reference voltage comprises a voltage divider circuit having at least one resistor.

17. The method of claim 14, further comprising selectively coupling the intermediate supply voltage to the output supply voltage utilizing a switch to thereby bypass the second stage voltage pump when the enable signal is not asserted.

18. The method of claim 11, further comprising storing and maintaining a level of the intermediate supply voltage utilizing a charge storage device having one end coupled to the intermediate supply voltage and another end coupled to ground.

19. The method of claim 11, further comprising asserting the enable signal utilizing the comparator when a desired output supply voltage exceeds a predetermined voltage.

20. The method of claim 19, further comprising asserting the enable signal utilizing the comparator when a desired output supply voltage exceeds a maximum possible intermediate supply voltage that could be generated by the first stage voltage pump.

* * * * *